UNITED STATES PATENT OFFICE.

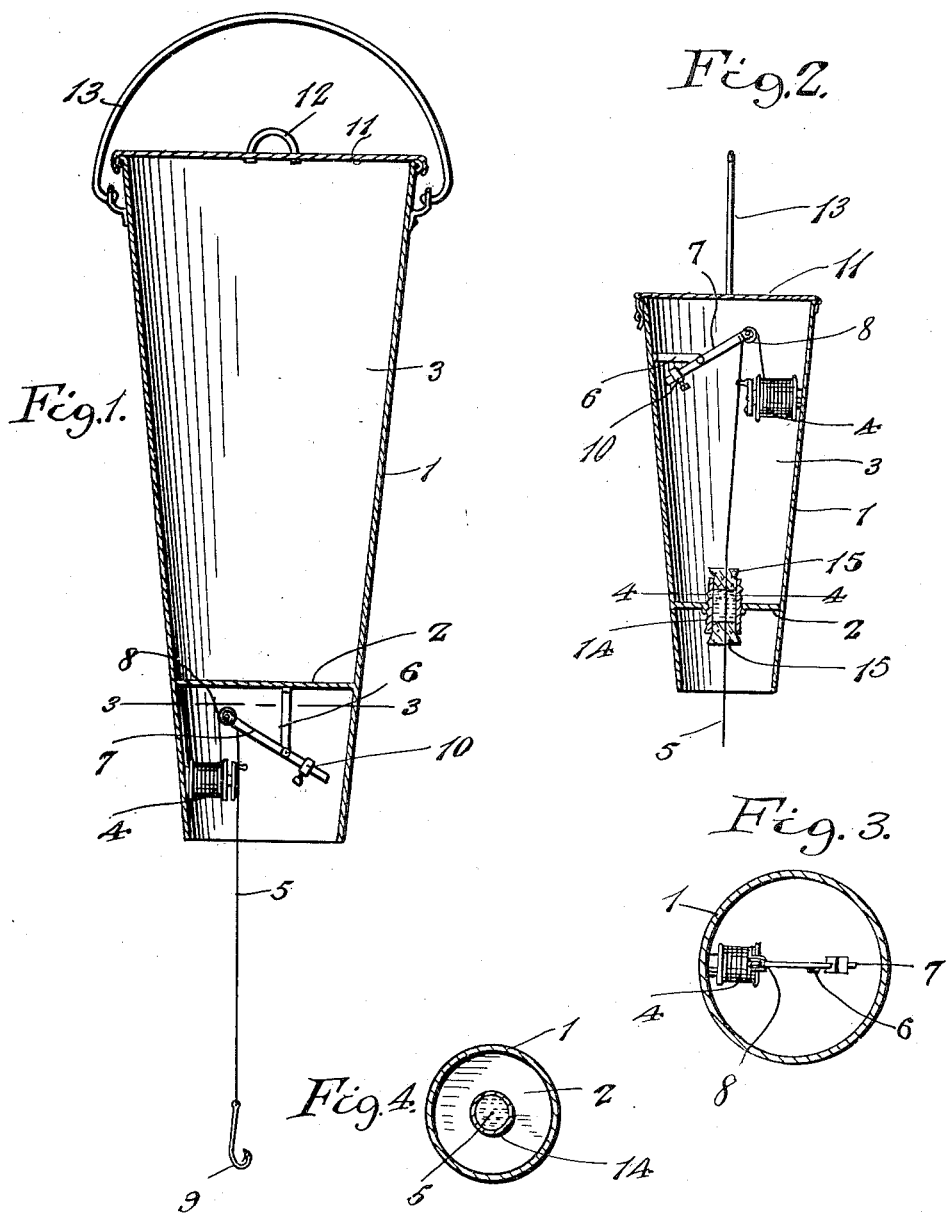

JOHN F. TEELING, OF WAYVILLE, NEW YORK.

FISHING-LINE HOLDER.

1,206,613.   Specification of Letters Patent.   Patented Nov. 28, 1916.

Application filed March 22, 1916. Serial No. 85,916.

*To all whom it may concern:*

Be it known that I, JOHN F. TEELING, a citizen of the United States, residing at Wayville, in the county of Saratoga and State of New York, have invented certain new and useful Improvements in Fishing-Line Holders; and I do hereby declare the following to be a full, clear, and exact description of the invention, such as will enable others skilled in the art to which it appertains to make and use the same.

This invention relates to a holder for fishing lines, designed to be positioned within an opening made in the ice of a frozen pond, river, or like body of water to prevent freezing of the line to the ice, and one object of the invention is to provide a holder of this nature which includes a hollow body of such configuration that it can be firmly held within the opening in the ice, and which will admit of a suitable heating medium being placed therein so as to heat the body and melt the surrounding ice when it is desired to remove the holder from operative position.

Another object of the invention is to associate with the holder a novel type of adjustable tension device for the line, so as to hold the line at various depths.

Other objects will appear and be better understood from that embodiment of my invention of which the following is a specification, reference being had to the accompanying drawings forming a part thereof, in which:

Figure 1 is a vertical sectional view, taken through the holder, showing the same in operative position, Fig. 2 is a vertical sectional view, taken through a modified form of holder, Fig. 3 is a transverse section, taken through the upper end of Fig. 2, Fig. 4 is a transverse section taken through the lower end of Fig. 2.

Referring to the drawings, the holder consists of an inverted substantially frusto-conical shaped body 1, the smaller end of which is adapted to be inserted within an opening made in the ice, the said smaller end being opened.

In the structure shown in Fig. 1, the body 1 has a partition 2 fitted therein, at a point above the lower end, so as to provide an upper compartment 3. A reel 4 is operatively mounted within the body, at a point spaced from the under side of the partition 2, and has a line 5 wound therearound. A vertically disposed bracket arm 6 extends from the under side of the partition 2 and has its lower end disposed above the plane of the reel 4, and a tension lever 7 is pivoted between its ends to the lower end of the bracket arm 6. One end of the lever 7 is bifurcated and overlies the reel 4 and mounted between the arms of the bifurcated end of the lever is a sheave 8 over which is passed the free end of the line 5, said end of the line passing out through the lower end of the body 1 and terminally provided with a hook 9. The other end of the lever 7 is provided with a slidable weight 10, which is adapted to be adjusted toward or away from the pivoted point of connection between the lower end of the arm 6 and the lever 7. The lever 7 serves to hold the line 5 taut and at the required depth, and by virtue of the weight 10 the bifurcated end of the lever can be raised or lowered, as desired, so as to admit of that portion of the line which is unwound from the reel being placed at various depths. The upper end of the body 1 is closed by means of a lid or cover 11, which can be hinged to the upper end of the body or, if desired, removably associated therewith, the said cover being provided with a handle 12 and the upper end of the body 1 is provided with a bail 13.

In the construction shown in Fig. 2, the reel 4 is journaled within the upper compartment of the body 1 and the bracket arm 6 to which the lever 7 is pivoted lies in the horizontal. In this construction the partition 2 is provided with a concentric opening into which is fitted a cylindrical receptacle 14, the upper and lower ends of which project, respectively, beyond the upper and lower sides of the partition 2 and are closed by means of stoppers 15, which can be formed of cork, or other suitable material. The stoppers 15 have alined openings therein through which passes the free end of the line 5. The receptacle 14 is to be filled with suitable non-freezable liquid, such as oil, so that the line in passing therethrough will be coated and prevent the formation of ice thereon. The liquid within the receptacle 14 will also prevent water from finding its way into the interior of the upper compartment of the body 1. By virtue of the shape of the holder, removal of the same from the opening in the ice will be facilitated.

When the structures shown in Figs. 1 and 2 are first placed within the opening in the ice, suitable weights, not shown, are to be mounted on the lid 11 so as to sufficiently weight the holder and cause the same to snugly insert itself within the opening. After the holder has been placed in operative position the weights are to be removed. When it is desired to remove the holder from operative position, a heating medium, not shown, is to be placed within the upper compartment of the receptacles 1 and 2 so as to heat the holder and cause melting of the surrounding ice, so that the holder can be easily removed from the opening.

Having thus described my invention what I claim as new, is:

1. A device of the class described comprising a hollow body having its lower end open, a reel operatively mounted within the body, a lever pivoted within the body, a sheave carried by one end of the lever, a line wound around the reel having one end passing over the sheave, and a weight slidably mounted on the lever.

2. A device of the class described comprising a hollow body having one end thereof open, a partition mounted within the body adjacent the open end, a bracket arm secured to the partition, a lever pivoted to the bracket arm, a reel journaled within the body, and a line wound around the reel and having one end trained over the sheave.

3. A device of the class described comprising a vertically disposed hollow body having its lower end open, a partition located within the body at the open end thereof and provided with an opening, a receptacle mounted in the opening in the partition and adapted to contain a non-freezable liquid, and a line having one end passing through the receptacle, and tension means for the line.

In testimony whereof I affix my signature in presence of two witnesses.

JOHN F. TEELING.

Witnesses:
  JOHN C. REEVES,
  WM. W. REEVES.

Copies of this patent may be obtained for five cents each, by addressing the "Commissioner of Patents, Washington, D C."